United States Patent [19]
Christianson

[11] 3,783,891
[45] Jan. 8, 1974

[54] BALANCED REGULATOR SECOND STAGE

[75] Inventor: Raymond A. Christianson, Inglewood, Calif.

[73] Assignee: Under Sea Industries, Inc., Compton, Calif.

[22] Filed: Mar. 22, 1972

[21] Appl. No.: 237,180

[52] U.S. Cl. ............................... 137/491, 137/494
[51] Int. Cl. ......................... A62b 7/00, B63c 11/16
[58] Field of Search .................... 137/491, 488, 494, 137/484.2, 63 R, 505.35, 505.43, 505.46; 128/142.5, 145, 147; 251/303

[56] References Cited
UNITED STATES PATENTS

| | | | |
|---|---|---|---|
| 2,839,077 | 6/1958 | Kristensson | 137/491 |
| 3,362,429 | 1/1968 | Volsk | 137/494 |
| 3,468,307 | 9/1969 | Cummins | 137/484.2 X |
| 2,032,613 | 3/1936 | Grove | 137/491 |
| 3,129,720 | 4/1964 | Allen et al. | 137/491 X |
| 479,234 | 7/1892 | Webb | 137/491 |
| 2,384,669 | 9/1945 | Fields | 137/491 X |

Primary Examiner—Henry T. Klinksiek
Assistant Examiner—Robert J. Miller
Attorney—Flam and Flam

[57] ABSTRACT

A balanced demand valve for use as the regulator second stage of a self contained underwater breathing apparatus. The device includes a primary valve which control the flow of breathable gas from a supply conduit inlet to a mouthpiece outlet chamber. The primary valve operates in response to the pressure differential between the inlet and a control chamber. A pilot valve controls the pressure in the control chamber in response to inhalation demand of the diver as sensed by a diaphragm located in the outlet chamber and linked to the pilot valve poppet. The mechanical advantage of the linkage together with the pneumatic amplifier cooperation of the pilot and primary valves provide sensitive regulator operation supplying breathable gas in close response to inhalation demand.

14 Claims, 4 Drawing Figures

BALANCED REGULATOR SECOND STAGE

BACKGROUND OF THE INVENTION

1. Field of the Invention

The present invention relates to regulators for underwater breathing apparatus, and more particularly to a balanced regulator second stage employing pneumatic amplification.

2. Description of the Prior Art

A self contained underwater breathing apparatus (scuba) typically employs a supply tank of air or other breathable gas under high pressure and a two stage regulator to provide this air to the diver. The regulator first stage is mounted at the supply tank and functions to reduce the air pressure to about 140 psi above the ambient pressure. A conduit supplies this reduced pressure air to a regulator second stage at the diver's mouthpiece. The second stage includes a demand valve system which opens to supply breathable gas in response to the inhalation effort of the diver. An exhaust port may be provided to discharge gas exhaled through the mouthpiece.

Ideally the regulator second stage will provide the diver exactly the volume of air required, without excessive inhalation effort. Various characteristics of the scuba system have prevented prior art regulators from achieving this objective. For example, the pressure of gas from the regulator first stage is a function of flow rate. Thus at the beginning of an inhalation cycle, when the flow rate is low, the pressure at the conduit connection to the regulator second stage may be 140 psi above ambient. Toward the middle of the inhalation cycle, when the flow rate is at a maximum, the pressure at the second stage input is much lower, typically on the order of 110 psi above ambient. This significant drop results primarily from the flow characteristics of the supply conduit, and generally is not attributable to regulator first stage operation. The pressure drop, which is maximum when inhalation demand is greatest, ameliorates against optimum demand regulator operation.

In the typical prior art regulator second stage, a diaphragm is situated in a chamber communicating to the mouthpiece. As the diver inhales, motion of the diaphragm is transmitted by a lever arm to a poppet valve which opens to permit flow of breathable gas from the supply conduit to the mouthpiece. This arrangement is mechanically very simple, but has certain disadvantages.

For example, since the diaphragm actuated valve directly controls the high pressure gas, only limited sensitivity is achieved. A small diaphragm motion must open the valve sufficiently to allow relatively large air flow. Ideally, the extent of valve opening, and hence the volume of air supplied to the diver, should be proportional to diaphragm displacement. But since the incoming air at conduit pressure forces directly against the same valve member which is linked to the diaphragm, such relationship is not achieved in practice. The result is that the air flow to the mouthpiece does not exactly follow the inhalation demand. Typically, a greater volume of air is supplied to the diver than is demanded by the inhalation cycle.

This problem is compounded during the second half of the inhalation cycle when the demand is decreasing. During this time, the diaphragm should be moving back toward the rest (no flow) position. However, the incoming flow pressure exerted on the valve, together with certain sliding friction between the lever and diaphragm, cause the valve to stay open wider or longer than it should. The result is a "hysteresis" effect during which air flows at an excessive rate through the demand regulator to the mouthpiece.

An object of the present invention is to provide an improved demand valve useful as a scuba regulator second stage. Pneumatic amplification is used to permit mechanical isolation between the diaphragm and the flow control valve, thereby to achieve a flow of breathable gas closely related to the inhalation demand.

SUMMARY OF THE INVENTION

The foregoing and other objectives of the invention are achieved by providing a regulator second stage wherein a balanced primary valve controls the flow of breathable gas from the supply conduit inlet to an outlet chamber leading to the mouthpiece. Unlike prior art devices, this primary valve is not controlled directly by mechanical linkage to the demand-sensing diaphragm. Rather, the primary valve is responsive to the pressure differential between the inlet and a control chamber the pressure in which is established by a pilot valve linked to the diaphragm. Pneumatic amplification isolates the diaphragm from the flow control valve to achieve sensitive response between inhalation demand and volume of air supplied to the diver.

A small orifice through the primary valve bleeds some inlet air to the control chamber, so that at rest the pressure on both sides of the primary valve is balanced; a spring biases the primary valve to the closed position. The pilot valve includes a pilot orifice in a secondary flow path from the control chamber to the outlet chamber. This pilot orifice is selectively blocked or unblocked by a valve poppet connected to the diaphragm by a linkage of high mechanical advantage. As the diaphragm senses reduced pressure in the outlet chamber, signifying an inhalation demand, the pilot orifice is slightly unblocked to lower the control chamber pressure. The resultant pressure differential between the inlet and the control chamber causes the primary valve to open proportionately, until the unbalanced pressure force exerted on the primary valve is balanced by the bias spring force. Supplied breathable gas flows past the primary valve directly to the outlet chamber and the mouthpiece.

Thus the pilot valve and primary valve cooperate to provide a volume of air at the mouthpiece which closely follows the inhalation demand. The undesirable hysteresis associated with prior art regulators is reduced substantially. Very little inhalation effort is needed to achieve adequate supply of air at the mouthpiece.

BRIEF DESCRIPTION OF THE DRAWINGS

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein.

DESCRIPTION OF THE PREFERRED EMBODIMENT

The following detailed description is of the best presently contemplated mode of carrying out the invention. This description is not to be taken in a limiting sense but is made merely for the purpose of illustrating the general principles of the invention since the scope of the invention best is defined by the appended claims.

Figure 1:
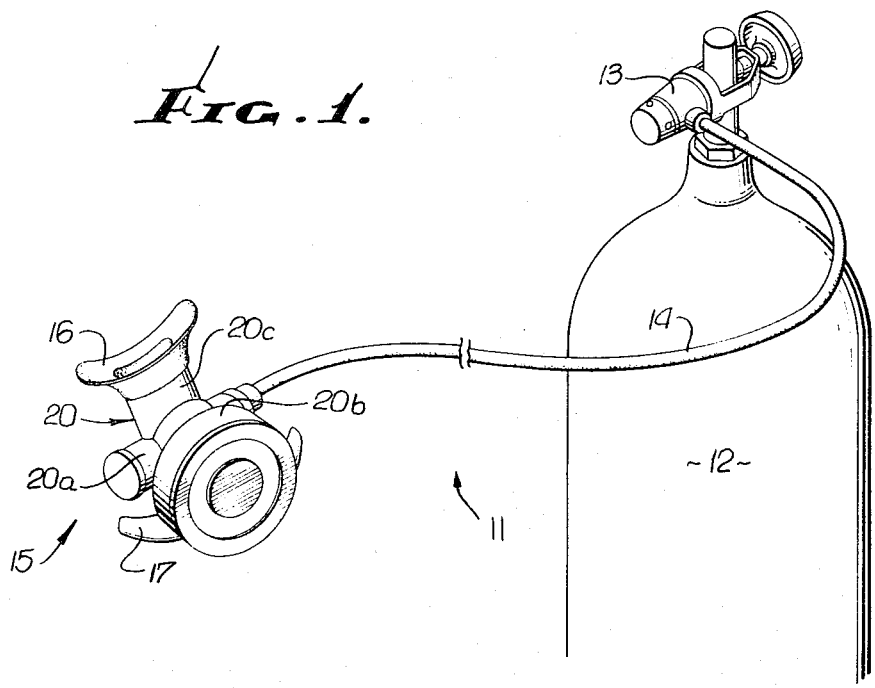
FIG. 1 is a pictorial view of an underwater breathing apparatus incorporating the novel regulator second stage.

Referring now to the drawings, and particularly to FIG. 1, there is shown a self-contained underwater breathing apparatus 11 incorporating the present invention. The scuba system 11 includes a supply tank 12 containing breathable gas under high pressure. Attached to the tank 12 is a conventional regulator first stage 13 which provides the breathable gas at a reduced pressure, typically 140 psi above ambient, to a conduit 14. The inventive regulator second stage 15 is connected to the other end of the conduit 14 and functions to deliver breathable gas to a diver via a mouthpiece 16 upon inhalation demand. An exhaust port 17 discharges gases exhaled through the mouthpiece 16. The exhaust port 17 forms no part of the present invention, but may be of the type shown in the U.S. Pat. No. 3,101,732 to Dalla Valle.

Figure 2:
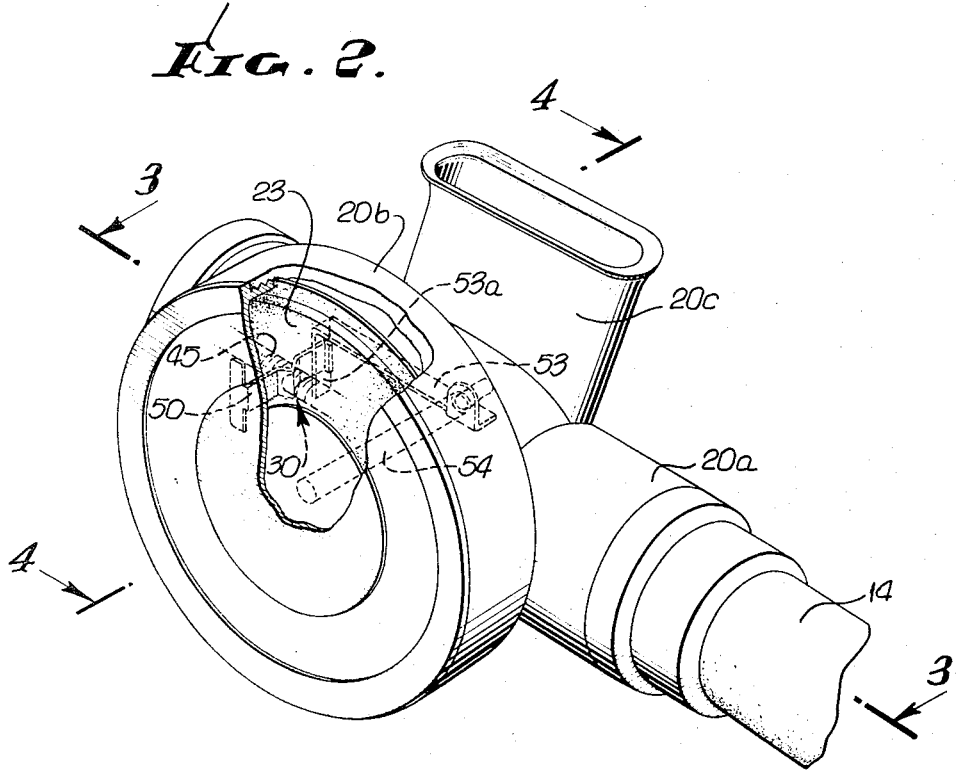
FIG. 2 is a perspective view, partly broken away and in section, of the regulator second stage of FIG. 1, with the exhaust port omitted for clarity.

The regulator second stage 15 includes a body 20 (FIGS. 2, 3 and 4) the hollow interior of which forms an outlet chamber 21. The body 20 has three main sections; a cylindrical section 20a contains the demand valve housing 22, a circular section 20b houses the diaphragm 23, and a tubular section 20c extends to the mouthpiece 16. The outlet chamber 21 thus surrounds the valve housing 22 and extends between the mouthpiece 16 and the diaphragm 23.

A threaded coupling 25 at one end of the body section 20a receives the conduit 14 and forms an inlet chamber 26 leading to a primary valve 27 which controls the flow of breathable gas through the regulator second stage 15. The primary valve 27 opens in response to the pressure differential between the inlet chamber 26 and a control chamber 28 within the housing 22. The control chamber 28 pressure is established by a pilot valve 29 connected by a linkage 30 to the diaphragm 23. As described below, this combination provides to the diver a volume of air closely related to the inhalation demand sensed by the diaphragm 23.

Figure 3:
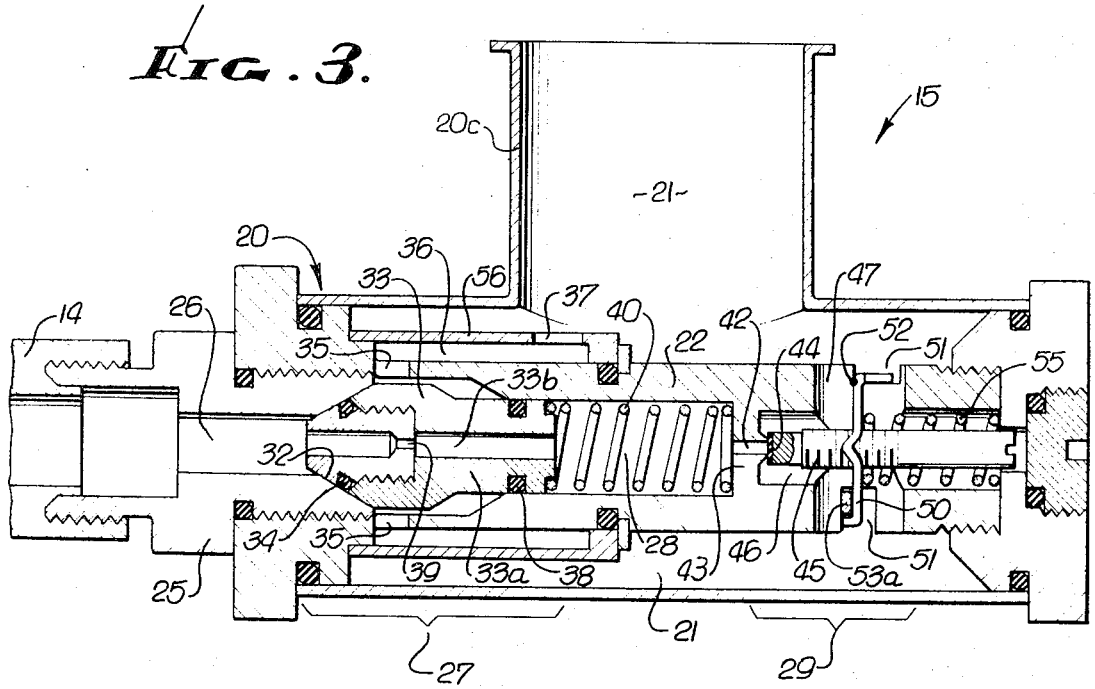
FIG. 3 is a transverse section view through the demand regulator, as seen generally along the line 3—3 of FIG. 2.
Figure 4:
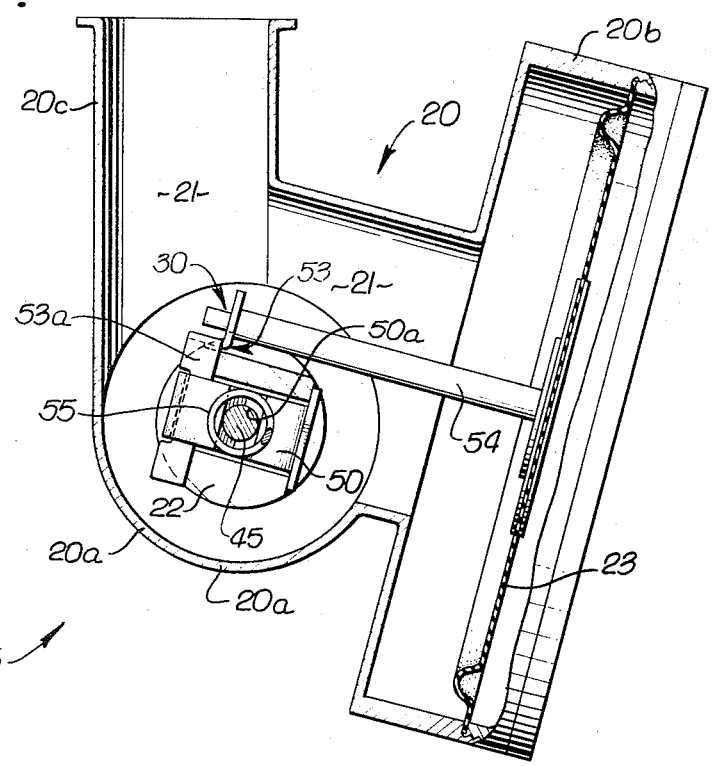
FIG. 4 is a transverse sectional view of the demand regulator as seen generally along the line 4—4 of FIG. 2.

The primary valve 27 includes a valve seat 32 formed at the interior end of the coupling 25 and centrally opening to the inlet chamber 26. A valve piston 33 is mounted for axial movement within the valve housing 22. In FIG. 3 the piston 33 is shown in the closed or flow-preventing position with the piston O-ring seal 34 against the valve seat 32. During the inhalation cycle, the valve piston 33 moves away from the valve seat 32 to permit the flow of air from the inlet chamber 26 through the space between the seat 32 and the piston 33 to a pair of lateral openings 35 leading via an annular space 36 and aspirator orifice 37 to the outlet chamber 21. The separation distance between the seat 32 and the piston 33 thus establishes the volume of breathable gas supplied by the primary valve 27 to the mouthpiece 16.

The cylindrical rear end 33a of the piston 33 is dimensioned to slide within the control chamber 28, an O-ring sealing the chamber-piston interface. A channel 33b through the piston 33 includes a bleed orifice 39 which allows limited flow of inlet air to the control chamber 28. Thus in the quiescent condition shown in FIG. 3, with the pilot valve 29 closed, the control chamber 28 pressure will equal the pressure in the inlet chamber 26. In this situation, a spring 40 within the control chamber 28 biases the piston 33 to the closed position.

The pilot valve 29 includes a pilot orifice 42 extending through a wall 43 forming the rear end of the control chamber 28. The orifice 42, which is preferably but not necessarily of slightly larger diameter than the bleed orifice 39, is selectively blocked or unblocked by a valve poppet 44. The poppet 44 comprises a rubber member mounted at the end of a threaded support 45 situated within a pilot chamber 46 defined in the valve housing 22. An outlet opening 47 communicates between the pilot chamber 46 and the outlet chamber 21. Thus, when the poppet 44 moves away from the pilor orifice 42 a secondary flow path is provided from the control chamber 28 via the pilot chamber 46 to the outlet chamber 21.

The pilot valve poppet 44 is actuated by motion of the diaphragm 23 transmitted by the linkage 30. To this end, the linkage 30 includes a demand lever 50 mounted through a pair of diametrically opposed openings 51 in the valve housing 22. The poppet support 45 is threaded through a hole 50a in the demand lever 50 and adjusted just to block the orifice 42 in the quiescent state. The demand lever 50 pivots about an edge 52 of the valve housing 22 in response to arcuate motion of the end 53a of a connection lever 53. The generally L-shaped connection lever 53 in turn is connected to a rigid stem 54 extending normally from the center of the diaphragm 23. A spring 55 biases the pilot valve 29 toward the closed position.

Motion of the diaphragm 23 toward the mouthpiece 16 causes the connection lever end 53a to rotate counterclockwise as viewed in FIG. 3. This causes the demand lever 50 to pivot counterclockwise, opening the pilot valve 29. The linkage 30 preferably provides significant mechanical advantage. Typically, the connection lever 53 may provide a 10:1 advantage, and the demand lever 50 may provide a 2:1 advantage. The resultant mechanical gain of 20:1 insures fine control of the pilot valve 29 in response to displacement of the diaphragm 23. The relatively small force exerted on the poppet 44 by air flowing from the control chamber 28 does not significantly impair this fine control.

As the diver inhales, the pressure in the outlet chamber 21 is reduced, causing displacement of the diaphragm 23 toward the mouthpiece 16 with concomitant opening of the pilot valve 29 and venting of the control chamber 28. Since the pilot orifice 42 is smaller than the bleed orifice 39, the control chamber 28 pressure will drop below that of the inlet chamber 26. The valve piston 33 will move away from the seat 32 until the spring 40 bias force counterbalances the unbalanced pressure force exerted on the inlet end of the piston. The diver is supplied with air.

Should the admitted air exceed the inhalation demand, the pressure in the outlet chamber 21 will begin to rise, displacing the diaphragm 23 away from the mouthpiece 16. This displacement will tend to close th pilot valve 29, blocking the secondary flow path through the pilot orifice 42. As the pressure in the control chamber 28 increases, the valve piston 33 is urged closed by the bias spring 40 reducing the flow of air to the diver.

As noted, air flow to the mouthpiece 16 is via the aspirator opening 37. The opening 37 is formed in a cylindrical member 56 rotatably surrounding a portion of the valve housing 22. By rotating the member 56, the position of the opening 37 with respect to the mouthpiece extension 20a can be adjusted for optimum Venturi or aspirator effect.

The pilot valve 29 and primary valve 27 together function as a pneumatic amplifier. The small diaphragm 23 force required to operate the poppet 44 is pneumatically amplified to move the much larger piston 33. The disadvantages inherent in direct mechanical transmission of force from diaphragm to flow-controlling valve are eliminated.

The volume of air supplied to the diver by the inventive regulator second stage 15 closely follows the inhalation demand. Little or no hysteresis is experienced which in prior art demand regulators caused delivery to the diver of excess air during the decreasing demand portion of the inhalation cycle.

Intending to claim all novel, useful and unobvious features shown or described, the applicant claims:

1. A demand valve for use as the second stage of a regulator in an underwater breathing apparatus, said demand valve receiving breathable gas from the supply tank associated regulator first stage via a conduit and providing said breathable gas to a diver via a mouthpiece in response to inhalation demand, comprising:
   a body including an inlet chamber to which said conduit is connected and an outlet chamber communicating to said mouthpiece,
   a generally internally cylindrical valve housing contained within said body,
   a primary valve within said valve housing and moveable axially thereof for controlling the flow of breathable gas between said inlet chamber and said outlet chamber,
   a diaphragm in said outlet chamber and responsive to the pressure therein for sensing said inhalation demand, and
   pneumatic amplifier means within said valve housing for operating said primary valve in response to the inhalation demand sensed by said diaphragm, said pneumatic amplifier means comprising;
   a control chamber within said valve housing, said primary valve opening in proportional response to the differential between the pressure in said inlet chamber and the pressure in said control chamber, and
   pilot valve means for establishing the pressure in said control chamber in response to said sensed inhalation demand, comprising a pilot orifice in a flow path between said control chamber and said outlet chamber, and a valve poppet mounted for axial movement within said valve housing and connected to said diaphragm by a linkage, said valve poppet cooperating with said pilot orifice to control the extent of opening thereof in response to said sensed inhalation demand.

2. A demand valve according to claim 1 wherein said primary valve includes a bleed orifice permitting limited air flow from said conduit to said control chamber, and a first spring biasing said primary valve toward a closed position as said pressure differential approaches zero, and
   a second spring biasing said valve poppet toward a position blocking said pilot orifice.

3. A demand regulator for use with an underwater breathing apparatus, comprising:
   a regulator body containing separate inlet, outlet and control chambers,
   primary valve means controlling flow between said inlet and outlet chambers in response to the pressure differential between said inlet and control chambers, said primary valve means comprising;
   a valve seat communicating from said inlet chamber,
   a valve piston adapted to reciprocate between a flow preventing closed position against said valve seat and open positions permitting flow from said inlet chamber to said outlet chamber,
   a bleed orifice permitting limited flow from said inlet chamber to said control chamber,
   a bias spring urging said valve piston toward said closed position,
   pilot valve means controlling the pressure in said control chamber in response to the pressure in said outlet chamber,
   a diaphragm in said outlet chamber, and
   a linkage operatively connecting said diaphragm to said pilot valve means, and
   wherein said valve piston reciprocates within a generally cylindrical valve housing within said regulator body, an annular chamber surrounding a portion of said valve housing, lateral openings in said housing permitting flow from said inlet chamber to said annular chamber in an amount established by the extent of opening of said valve piston, and an aspirator opening from said annular chamber to said outlet chamber.

4. A regulator according to claim 3 wherein said valve piston separates said inlet chamber from said control chamber, and wherein said bias spring is situated within said control chamber.

5. A regulator according to claim 3 wherein said pilot valve means comprises:
   a pilot orifice communicating from said control chamber,
   a valve poppet connected to said diaphragm by said linkage for selectively opening or closing said pilot orifice in response to pressure in said outlet chamber as sensed by said diaphragm.

6. A regulator according to claim 5 further comprising a bleed orifice permitting limited flow from said inlet chamber to said control chamber, said bleed orifice being of smaller diameter than said pilot orifice, wherein said linkage provides substantial mechanical advantage, and wherein said valve poppet is spring biased toward the pilot orifice closing position.

7. A regulator according to claim 3 wherein said aspirator opening is in a generally cylindrical member surrounding a portion of said valve housing and defining said annular chamber, the radial orientation of said cylindrical member being adjustable with respect to said regulator body to control the amount of aspirator effect.

8. A balanced regulator for use with a breathing apparatus comprising:

primary valve means for controlling the flow of a breathable gas from an inlet to an outlet in response to the pressure differential between said inlet and a control chamber, said primary valve means comprising a valve piston movable with respect to a valve seat communicating to said inlet, and a lateral passageway for flow of said gas past said piston to said outlet in proportion to the separation of said piston from said seat, a bleed orifice providing a secondary flow path from said inlet through said piston to said control chamber, and a spring biasing said piston toward said valve seat, and pilot valve means for controlling the pressure in said control chamber in response to inhalation demand for said gas, the amount of supplied breathable gas thus corresponding to said demand, said pilot valve means comprising a pilot orifice and a cooperating valve poppet in the secondary flow path between said control chamber and said outlet, spring means urging said poppet into blocking relationship with said pilot orifice, and means for sensing said inhalation demand and for operating said poppet in response thereto.

9. A balanced regulator according to claim 8 wherein said means for sensing comprises a diaphragm responsive to the gas pressure at said outlet, and a linkage with substantial mechanical advantage between said diaphragm and said poppet.

10. A balanced regulator second stage for use with an underwater breathing apparatus, comprising:

a. a body having an outlet for connection to a mouthpiece and an inlet for connection to a conduit from the air supply tank of said apparatus, b. a valve housing within said body and having a valve seat communicating from said inlet, c. a valve piston within said housing movable toward and away from said valve seat, the spacing of said piston from said valve seat establishing the magnitude of flow between said inlet and said outlet, said piston extending into a control chamber within said housing, a bleed orifice through said piston permitting limited air flow from said inlet to said control chamber, d. a first spring within said control chamber biasing said piston toward said valve seat, e. a pilot orifice of lesser restriction than said bleed orifice communicating from said control chamber to said outlet, f. a valve poppet for selectively blocking or unblocking air flow through said pilot orifice, said valve poppet being mounted within and movable axially of said valve housing, g. a diaphragm within said body external to said housing and in pressure sensing relationship with said outlet, and h. a linkage transmitting movement of said diaphragm to said poppet with mechanical advantage, inhalation demand sensed by said diaphragm causing said poppet and pilot orifice cooperatively to modify the pressure in said control chamber, thereby causing movement of said piston to a position resulting in air flow from said conduit to said outlet in an amount to satisfy said demand.

11. A regulator according to claim 10, further comprising:

i. a generally cylindrical member surrounding a portion of said housing to define therewith an annular chamber, j. at least one lateral opening through said housing to permit air flow from said inlet chamber into said annular chamber at a rate established by the spacing between said piston and said valve seat, and k. an aspirator opening through said cylindrical member to permit flow from said annular chamber to said outlet, the radial orientation of said cylindrical member being adjustable to control the amount of aspirator action.

12. A regulator according to claim 10 wherein the region within said body exterior of said valve housing comprises an outlet chamber, said diaphragm being responsive to the pressure within said outlet chamber, wherein said linkage comprises a diaphragm stem extending from said diaphragm, a demand lever for transmitting motion to said valve poppet, and a connection lever operatively connecting said diaphragm stem to said demand lever, and further comprising a second spring biasing said valve poppet toward a position blocking said pilot orifice.

13. A regulator according to claim 12 wherein the mechanical advantage of said linkage is at least 10 to 1.

14. A regulator according to claim 12 further comprising means for adjusting the force of said second spring, such adjustment controlling the demand effort needed to actuate said regulator.

* * * * *